US012535840B1

(12) United States Patent
Lenka et al.

(10) Patent No.: US 12,535,840 B1
(45) Date of Patent: Jan. 27, 2026

(54) BANDGAP REFERENCE CIRCUIT

(71) Applicant: Cadence Design Systems, Inc., San Jose, CA (US)

(72) Inventors: Prakash Kumar Lenka, Orissa (IN); Sumit Gupta, Madhya Pradesh (IN); Preetam Mohan Meharwade, Karnataka (IN)

(73) Assignee: Cadence Design Systems, Inc., San Jose, CA (US)

( * ) Notice: Subject to any disclaimer, the term of this patent is extended or adjusted under 35 U.S.C. 154(b) by 199 days.

(21) Appl. No.: 18/144,302

(22) Filed: May 8, 2023

(51) Int. Cl.
*G05F 1/46* (2006.01)
*G05F 1/565* (2006.01)
*G05F 3/26* (2006.01)

(52) U.S. Cl.
CPC .............. *G05F 1/468* (2013.01); *G05F 1/565* (2013.01); *G05F 3/262* (2013.01)

(58) Field of Classification Search
CPC ..... G05F 3/08; G05F 3/16; G05F 3/26; G05F 3/267
See application file for complete search history.

(56) References Cited

U.S. PATENT DOCUMENTS

| | | | | |
|---|---|---|---|---|
| 8,692,529 | B1 * | 4/2014 | Wyatt | G05F 1/56 323/280 |
| 10,429,868 | B2 * | 10/2019 | Elhebeary | G05F 1/575 |
| 10,983,547 | B1 * | 4/2021 | Ivanov | G05F 3/267 |
| 11,146,262 | B1 * | 10/2021 | Wang | H03K 17/162 |
| 2014/0001958 | A1 * | 1/2014 | Park | H05B 45/48 315/122 |
| 2020/0012308 | A1 * | 1/2020 | Chen | G05F 3/30 |

* cited by examiner

*Primary Examiner* — Jue Zhang
*Assistant Examiner* — Lakaisha Jackson
(74) *Attorney, Agent, or Firm* — Mark H. Whittenberger; Holland & Knight LLP

(57) ABSTRACT

Embodiments include herein are directed towards a circuit having a core bandgap reference circuit including a first transistor, a second transistor, and a differential amplifier. The circuit may further include a cascoded bandgap reference circuit in electrical communication with the core bandgap reference circuit, wherein the cascoded bandgap reference circuit includes a first supply noise path that includes a plurality of transistors that are electrically connected and a flipped voltage follower configuration that reduces an impedance at a transistor associated with a second supply noise path.

8 Claims, 10 Drawing Sheets

500

$$\Delta V_Z = \Delta V \times (r_o/(r_o + r_{o4})) + f(\Delta V_Y)$$

$$f = (r_o \| r_{o4})/[(1/g_{m4}) + (r_o \| r_{o4})]$$

200

300

400

500

600

700

800

1000

BANDGAP REFERENCE CIRCUIT

BACKGROUND

A bandgap reference circuit is a frequently used block for voltage regulators, analog to digital converters (ADCs), and digital to analog converters (DACs). In double data rate/graphics double data rate (DDR/GDDR) memory architectures it is often necessary to have a low supply voltage with a good power supply rejection ratio (PSRR) of the bandgap reference circuit (BGR).

SUMMARY

In one or more embodiments of the present disclosure, a circuit is provided. The circuit may include a core bandgap reference circuit including a first transistor, a second transistor, and a differential amplifier. The circuit may further include a cascoded bandgap reference circuit in electrical communication with the core bandgap reference circuit, wherein the cascoded bandgap reference circuit includes a first supply noise path that includes a plurality of transistors that are electrically connected and a flipped voltage follower configuration that reduces an impedance at a transistor associated with a second supply noise path.

One or more of the following features may be included. In some embodiments, the plurality of transistors may include a third transistor, a fourth transistor, and a fifth transistor. A node of the supply noise path may be directly connected to the fifth transistor. The second supply noise path may include a plurality of transistors. The transistor associated with the second supply noise path may be connected to a node of the first supply noise path. The node may be located between the fourth transistor and the fifth transistor. The first transistor and the second transistor of the core bandgap reference circuit may be in electrical communication with the first and second supply noise paths.

In one or more embodiments of the present disclosure, a method is provided. The method may include providing a core bandgap reference circuit including a first transistor, a second transistor, and a differential amplifier. The method may further include transmitting a signal from the core bandgap reference circuit to a cascoded bandgap reference circuit that is in electrical communication with the core bandgap reference circuit, wherein the cascoded bandgap reference circuit includes a first supply noise path that includes a plurality of transistors that are electrically connected and a flipped voltage follower configuration that reduces an impedance at a transistor associated with a second supply noise path.

One or more of the following features may be included. In some embodiments, the plurality of transistors may include a third transistor, a fourth transistor, and a fifth transistor. A node of the supply noise path may be directly connected to the fifth transistor. The second supply noise path may include a plurality of transistors. The transistor associated with the second supply noise path may be connected to a node of the first supply noise path. The node may be located between the fourth transistor and the fifth transistor. The first transistor and the second transistor of the core bandgap reference circuit may be in electrical communication with the first and second supply noise paths.

In yet another embodiment of the present disclosure, a system is provided. The system may include a voltage generator including a core bandgap reference circuit including a first transistor, a second transistor, and a differential amplifier. The voltage generator may further include a cascoded bandgap reference circuit in electrical communication with the core bandgap reference circuit, wherein the cascoded bandgap reference circuit includes a first supply noise path that includes a plurality of transistors that are electrically connected and a flipped voltage follower configuration that reduces an impedance at a transistor associated with a second supply noise path. The system may further include an analog to digital converter configured to receive an output from the voltage generator and a digital to analog converter configured to receive an output from the analog to digital converter. The system may also include a differential amplifier configured to receive an output from the digital to analog converter.

One or more of the following features may be included. In some embodiments, the plurality of transistors includes a third transistor, a fourth transistor, and a fifth transistor. A node of the supply noise path may be directly connected to the fifth transistor. The second supply noise path may include a plurality of transistors. The transistor associated with the second supply noise path may be connected to a node of the first supply noise path. The node may be located between the fourth transistor and the fifth transistor. The first transistor and the second transistor of the core bandgap reference circuit may be in electrical communication with the first and second supply noise paths.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
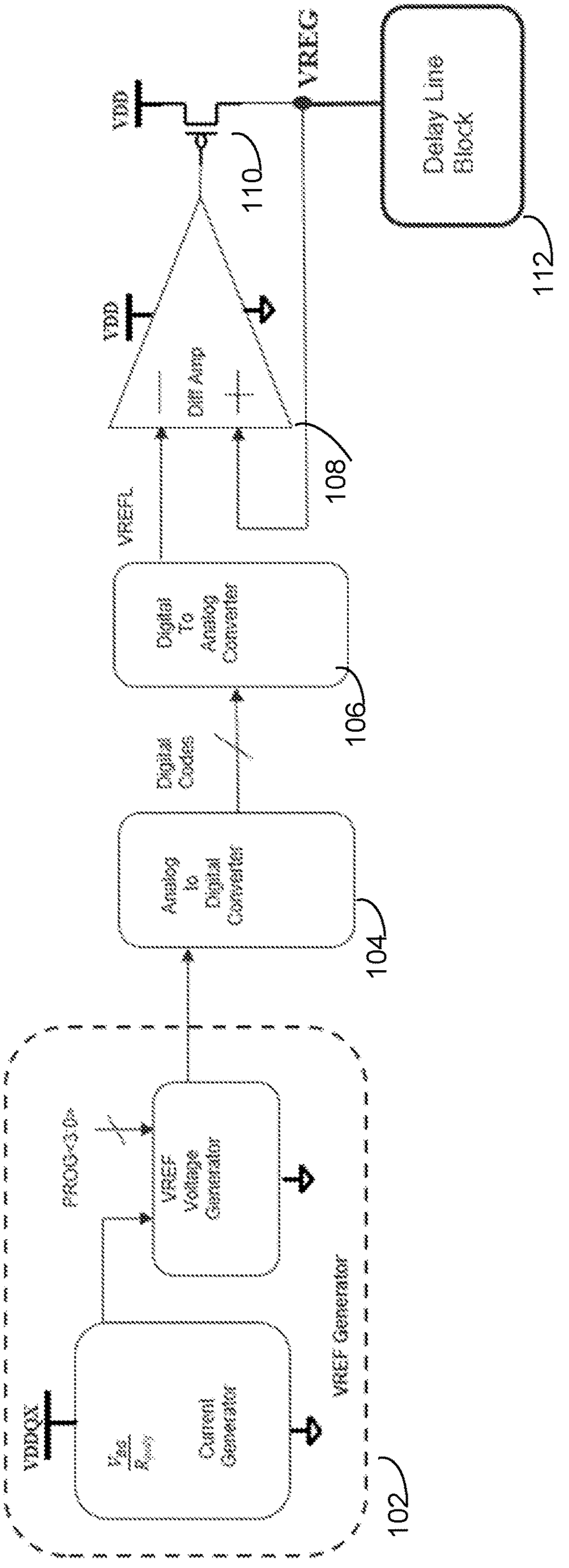
FIG. 1 diagrammatically depicts a block diagram of a voltage reference generator according to an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Referring to FIG. 1, there is shown a block diagram 100 of a voltage reference generator 102 according to an embodiment of the present disclosure. Voltage reference generator 102 may include a current generator and an associated voltage generator. The voltage reference generator may generate an output that may be received by analog to digital converter (ADC) 104, which in turn, generates an output that is received by digital to analog converter (DAC) 106. Differential amplifier 108 may receive an input from digital to analog converter 106 and provide an output to transistor 110, which is in communication with delay line block 112.

A bandgap reference circuit is a frequently used block for voltage regulators, ADCs and DACs. In double data rate/graphics double data rate (DDR/GDDR) memory architectures, the requirement of a low supply voltage having a good power supply rejection ratio (PSRR) of a bandgap reference circuit (BGR) is becoming more desirable. However, in the most popular current mode BGR circuit there is a strong trade-off between mismatch and direct current (DC) PSRR, in a low supply voltage operation. For bipolar junction transistor (BJT) diodes used in BGR to work properly, i.e., for lowering the sensitivity with respect to various processes (e.g., (typical/slow/fast)) and proper operating point of BJT diodes, it may be helpful to use a higher cut-in voltage for BJT diodes. This may then create a challenge with respect to DC PSRR as well as any reduction of random mismatch in the BGR architecture.

Figure 2:
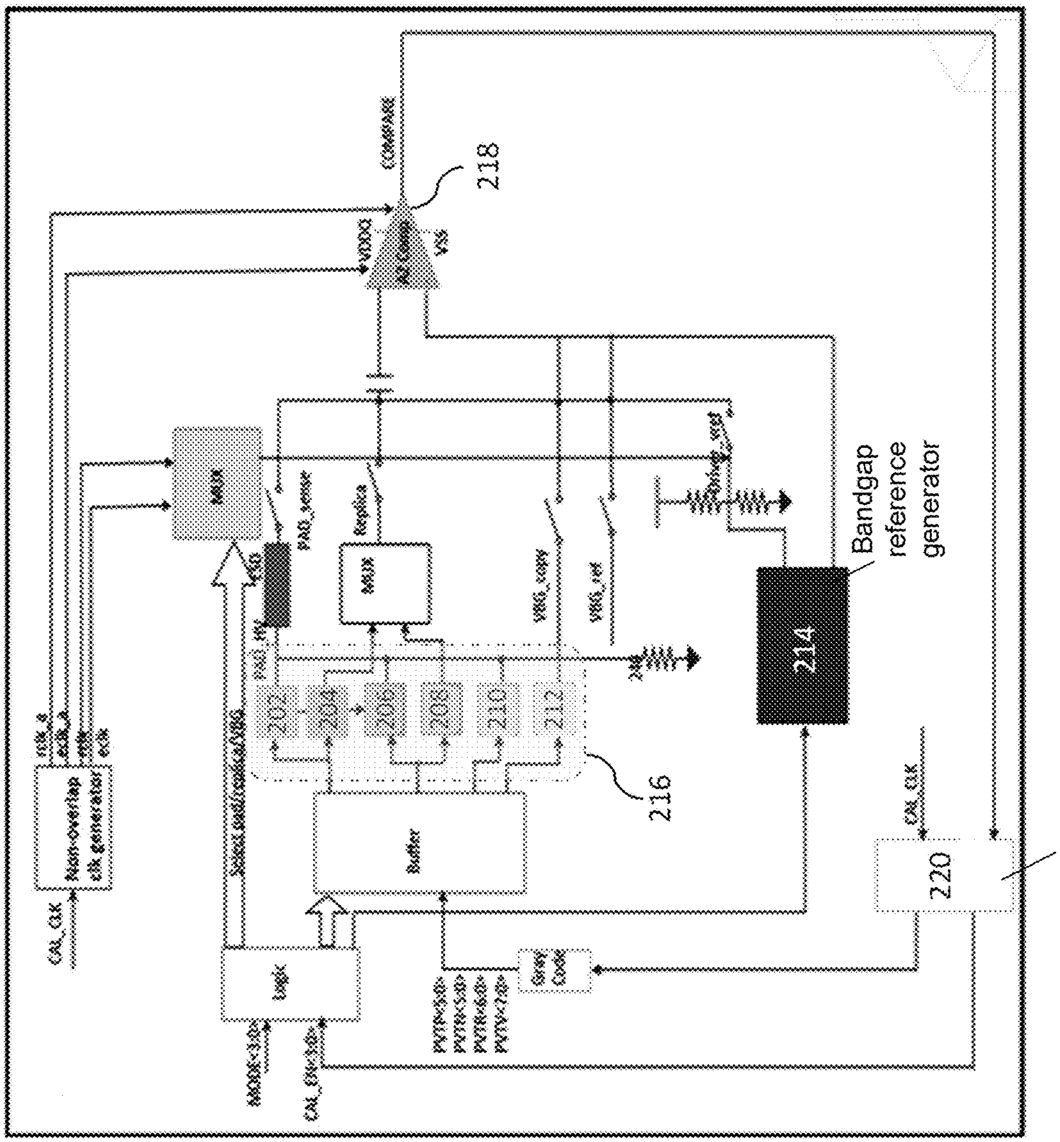
FIG. 2 is a diagram showing an example of a calibration circuit according to an embodiment of the present disclosure.

Referring also to FIG. 2, a block diagram 200 depicting an example of a calibration circuit consistent with embodiments of the present disclosure is provided. FIG. 2 includes transmitter pull up (TXPU) 202, transmitter pull down (TXPD) 204, chip select pull up (CSPU) 206, chip select pull down (CSPD) 208, process voltage temperature code for receiver (PVTR) 210, and process voltage temperature code for voltage regulator (PVTV) 212. Block diagram 200 shows the significance of having a high DC PSRR in a BGR circuit. As shown in FIG. 2, calibration circuit 200 may generate different calibration codes for process, voltage, temperature (PVT) variations, using bandgap reference generator 214. In some embodiments, calibration block 216 may execute the calibration of any transmitters (TX), receivers (RX) and regulator blocks necessary for proper operation in a DDR/GDDR application owing to different PVT conditions. As depicted in FIG. 2, reference generator 214 may produce a change in the reference voltage with the change in the supply voltage which, in turn, affects the calibration code accuracy and directly impacts the performance of TX, RX, and regulator block. Since the loop is operating at a low frequency, the low frequency PSRR of reference generator 214 directly affects the calibration code (e.g., PVTP, PVTN, PVTR, PVTV).

FIG. 2 shows how calibration block 216, which may produce various calibration codes for all the IO blocks, TXPU 202, TXPD 204, CSPU 206, CSPD 208, PVTR 210, PVTV 212 may be strongly dependent on the BGR reference voltage (VBG_ref). As shown in FIG. 2, the reference voltage VBG_ref, which may be generated from the BGR block 216 may be compared with the replica voltage of various IO blocks. The auto zero (AZ) comparator block 218, which may compare one or more voltages (e.g., VBG_ref, replica voltage, etc.) and depending upon the output of the autozero comparator 218, finite state machine (FSM) block 220 may change the code until the comparison process is stopped and the entire loop may be locked for proper calibration code.

Figure 3:
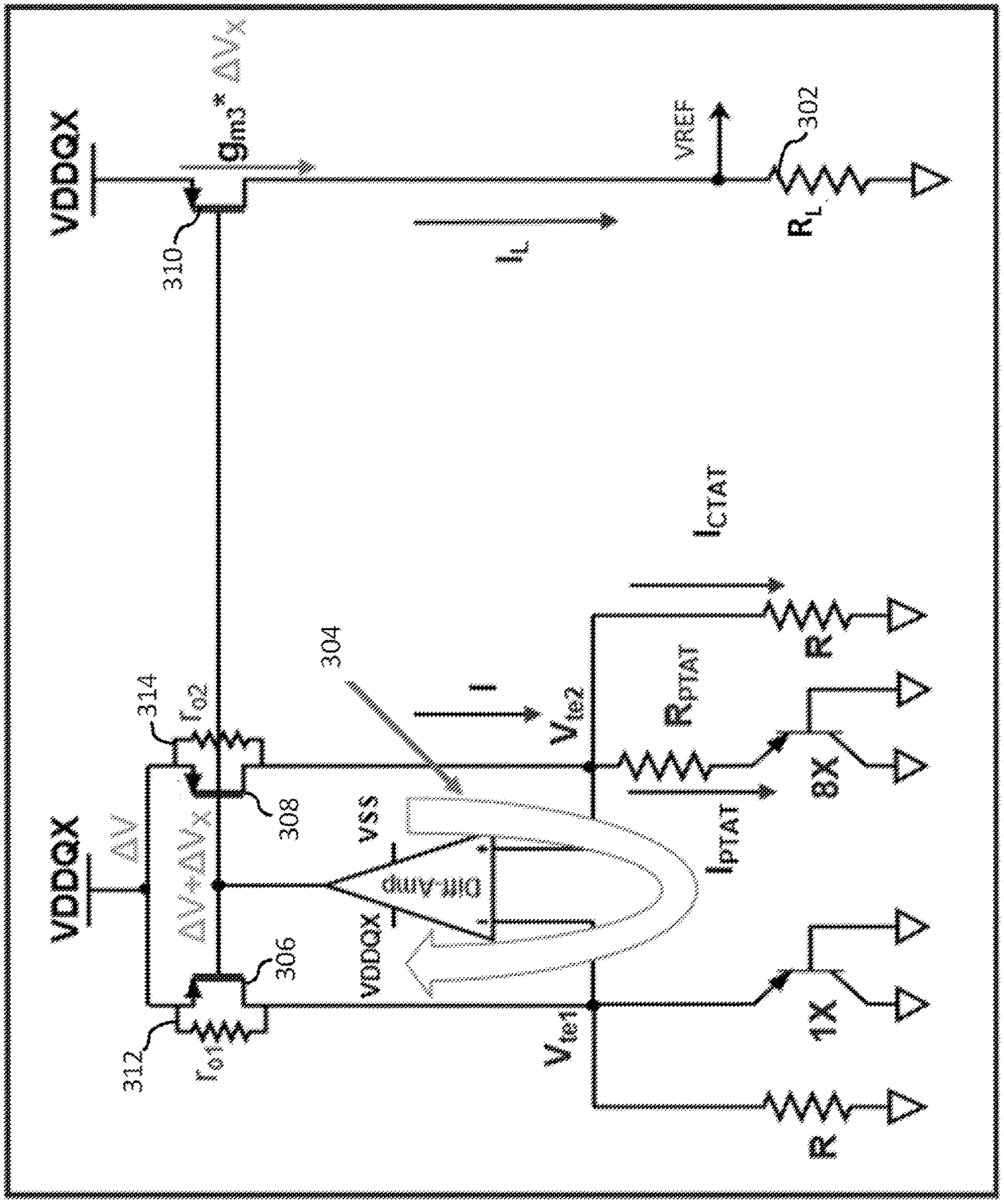
FIG. 3 is a diagram showing an example of a conventional current mode bandgap reference circuit according to embodiments of the present disclosure.

Referring now to FIG. 3, a diagram showing an example of a conventional current mode bandgap reference circuit 300 is provided. As shown in FIG. 3, the conventional current mode BGR circuit 300 produces a voltage (VREF) by allowing the temperature independent current I to pass through resistor 302 having constant resistance $R_L$ with respect to temperature. The constant current I which may correspond to adding $I_{PTAT}$ and $I_{CTAT}$ with a proper ratio so that it may be independent of temperature. The load current $I_L$ may be mirrored from I and may flow through resistor 302 having load resistance $R_L$ to create the bandgap reference voltage (VREF). This particular circuit does have a few limitations. With the change in supply voltage $\Delta V$ on the VDDQX node, the BGR loop 304 may attempt to replicate the same $\Delta V$ change at the gate of current sources (transistors) 306, 308, 310. However, with a low VDDQX (1V) and low temperature (−40 C), the threshold voltage of transistors 306, 310 may increase. Also, $V_{te1}$ and $V_{te2}$ sit at higher voltages (880 mV) for adequate junction voltages of BJTs across corners. The low VDDQX (1V) and high $V_{te1}$, $V_{te2}$ (880 mV) result in a lower drain to source voltage ($V_{ds}$) of transistors 306 and 308 which, in turn, creates lower output resistances $r_{o1}$, $r_{o2}$ at resistors 312, 314 for transistors 306, 308 respectively. Due to low output resistances at resistors 312, 314 the differential amplifier in the core loop 304 as shown in FIG. 3 may produce an extra voltage change $\Delta V_X$ to compensate for the supply noise effect in the path of output resistors 312, 314. The extra change in $\Delta V_X$ creates an extra current of $gm3 \times \Delta V_X$ which flows through load resistor 302 and degrades the PSRR of BGR significantly.

Figure 4:
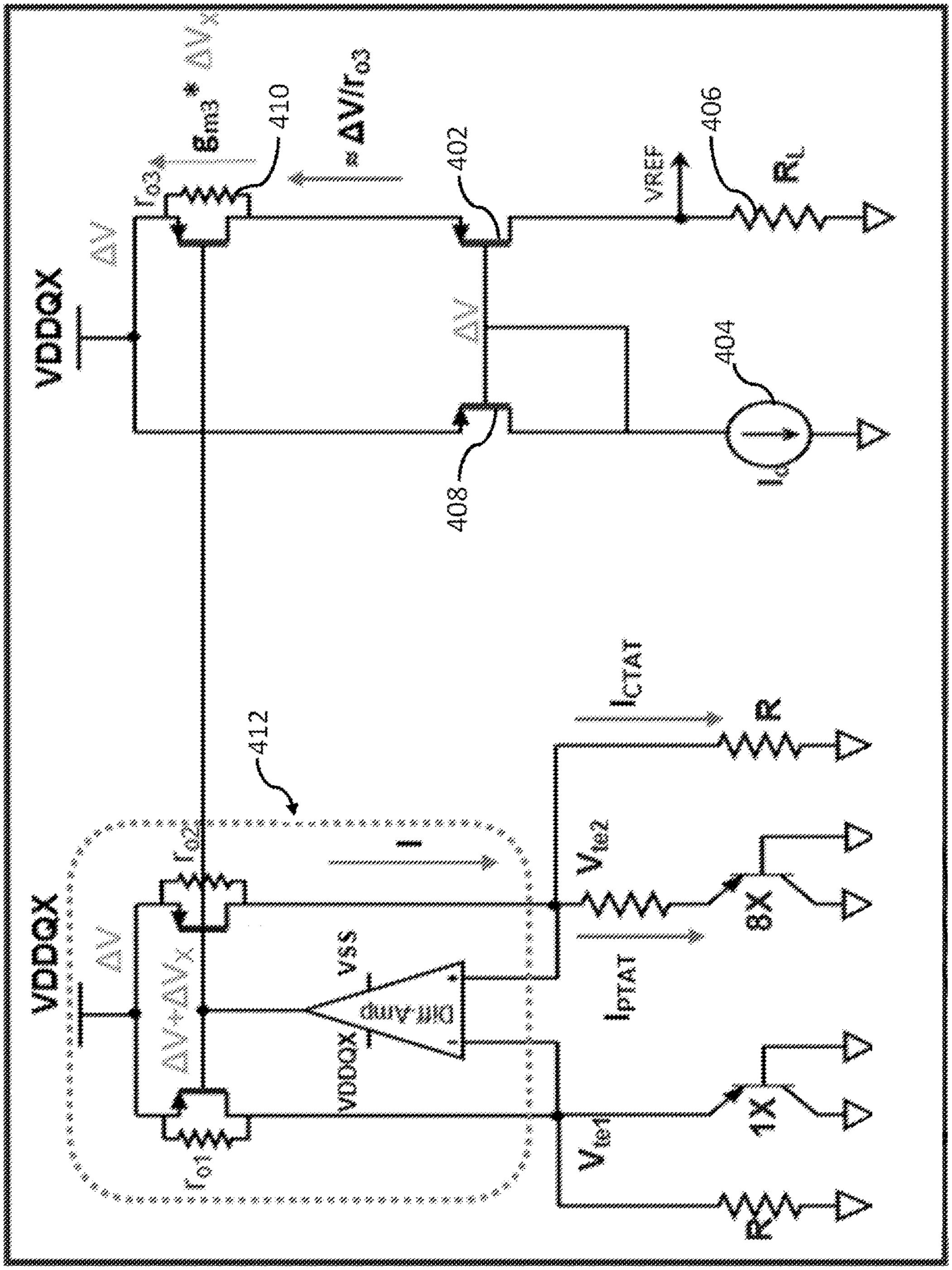
FIG. 4 is a diagram showing an example of a cascoded current mode bandgap reference circuit according to embodiments of the present disclosure.

Referring now to FIG. 4, a diagram showing an example of a cascoded current mode bandgap reference circuit 400 is provided. As shown in FIG. 4, the cascoded current mode BGR circuit 400 in a somewhat similar manner to the conventional BGR (shown in FIG. 3), however, it includes important differences. For example, BGR circuit 400 may further include cascoded transistor 402 located between a mirrored current source 404 and load resistor 406 having resistance ($R_L$). FIG. 4 shows an example cascoded current mode BGR architecture 400, where cascoded transistor 402 may be biased with a pmos based transistor 408 for improving the supply noise rejection. This particular circuit 400 does have a few limitations. As shown in FIG. 4, with a change in the supply voltage ΔV on the VDDQX node, the same ΔV may also be reflected on the gate of transistors 402, 408 due to a high impedance of the current source 404. The ΔV produced on the gate of transistors 402, 408 may create the change in current of $\Delta V/r_{o3}$ due to the source degeneration effect of transistor 402 in the form of resistor 410 having ($r_{o3}$) as shown in FIG. 4. The extra noise current ($g_{m3}\times\Delta V$) which is produced from the core BGR 412 remains the same and flows into load resistor 406 through transistor 402. As shown in FIG. 4 the two noise currents $gm_3\times\Delta V_x$ and $\Delta V/r_{o3}$ may be added in the same direction and worsen the PSRR of BGR.

The DC PSRR in the BGR circuit 400 has a strong dependency on the supply voltage lowering as well as the small signal output impedance ($r_{ds}$) of the current sources used in the BGR core block 412. In the lower FET technology node (e.g., 5 nm, 3 nm), the use of the lower supply voltage is more demanding, which leads to many performance challenges in some analog blocks (e.g., BGR, regulators, etc.). BJT diodes may be used to generate the $I_{PTAT}$ (proportional to absolute temperature current) and $I_{CTAT}$ (complementary to absolute temperature current) in BGR 412 block are sensitive to various processes (e.g., slow, fast corners, etc.) and the accuracy of the model files used for simulation purpose. Accordingly, for faithful operations of a BGR block 412 in silicon, it may be helpful to have BJT diodes that are less dependent on model files and to have processes that require operation in higher cut-in voltage of BJT diodes (>850 mV) as well as higher DC current (>20 uA) consumption in the BJT branch. The voltage margin ($V_{ds}$) across the current sources may be lower due to the high cut-in voltage of BJT diodes and lower supply voltage (1V), which degrades the output impedance of current sources. However, there is a need for a higher output impedance to reduce the effect of power supply noise and a higher voltage margin ($V_{ds}$) across the current source to reduce the effect of random mismatch. As such, there is a strong tradeoff between PSRR and error in the BGR voltage due to random mismatch, which is the bottleneck in the conventional current mode BGR architecture.

Referring now to FIGS. 5-10, embodiments of the present disclosure are provided that address some of the deficiencies discussed above. These embodiments are directed towards a flipped voltage follower (FVF) based cascoded BGR architecture 700, 800, 1000. This architecture helps in reducing the DC PSRR of VBG_ref quite significantly. This particular configuration works well for lower supply voltage design requirements, which may make the BGR output less sensitive to lower supply voltages.

In some embodiments, the circuits included herein may act to oppose the flow of supply noise current by accurately tracking the gate and the source of cascoded transistors. Accordingly, the flipped voltage follower (FVF) cascoded architecture 700, 800, 1000 may help in tracking the gate and source of cascoded transistors due to a reduction of the output impedance. The circuit also helps in reducing the PSRR owing to the equal tracking of the gate and the source voltage, when there is a noise effect in the supply voltage. Embodiments included herein also may help in breaking the trade-off between PSRR and error due to any random mismatch. The FVF cascoded architecture 700, 800, 1000 described herein may use the flipped voltage follower structure 702, 814, 1012 in the cascoded portion of the overall architecture without involving the core portion of the BGR block 504. Accordingly, it may not affect the error voltage due to random mismatch while improving the supply sensitivity (PSRR) only. Embodiments included herein, in contrast with existing technologies, may use less power and less area to implement the FVF circuit 702, 814, 1012. The flipped voltage follower (FVF) cascoded architecture 700, 800, 1000 also helps in improving the PSRR with low power and less area due to its inherent feedback property, which helps in lowering the output impedance with low DC power consumption.

Figure 5:
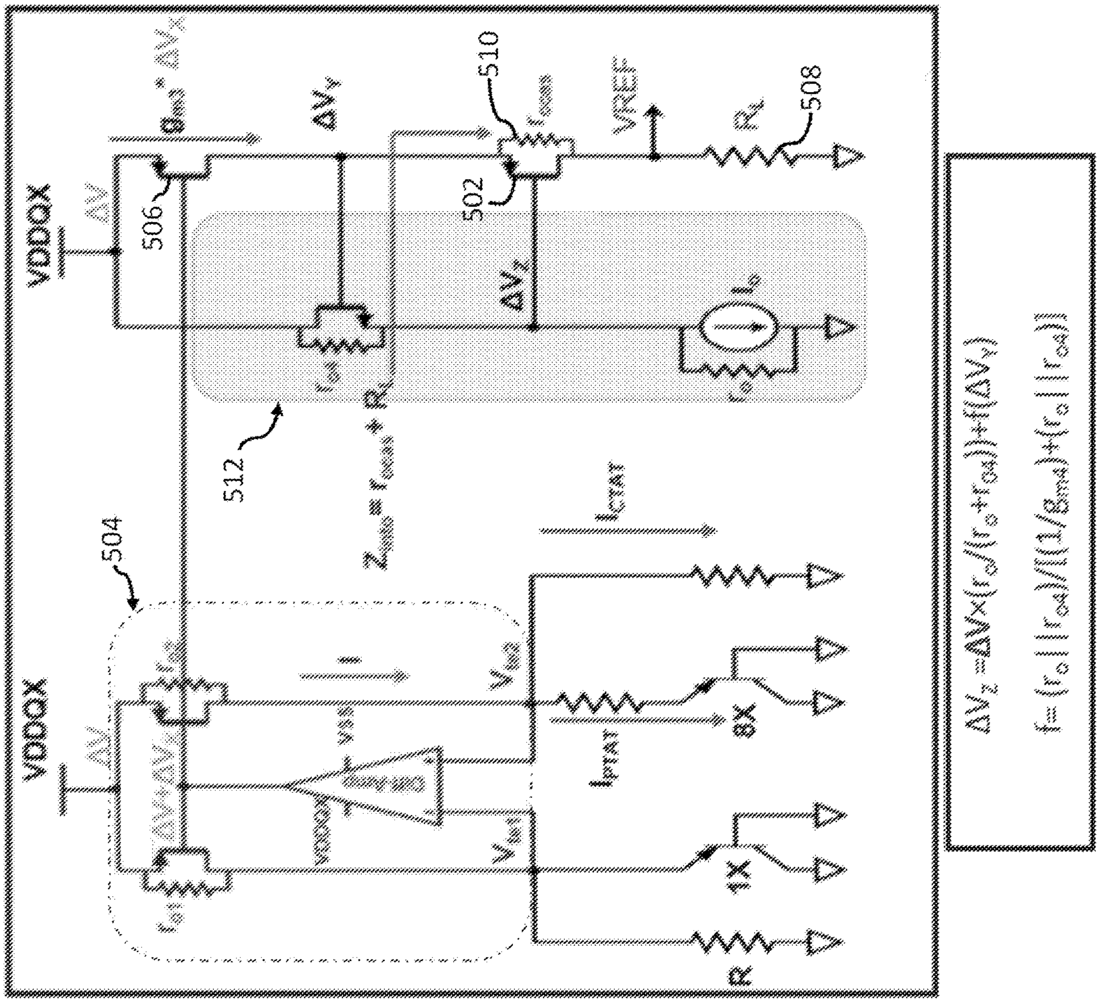
FIG. 5 is a diagram showing an example of a source follower cascoded bandgap reference circuit according to embodiments of the present disclosure.

Referring now to FIG. 5 an example of a source follower cascoded bandgap reference circuit 500 is provided. The prime objective behind the improvement of DC PSRR is to oppose the extra noise current $gm_3\times\Delta V_x$, that flows through transistor 506. The objective may be achieved by placing the cascoded transistor 502 in between transistor 506 and load resistor 508 as shown in FIG. 5. Additionally and/or alternatively, the source and gate of cascoded transistor 502 should track each other so that the impedance looking through the source of cascoded transistor 502 will be $r_{ocas}+R_L$, where $r_{ocas}$ is the output resistance of resistor 510 of cascoded transistor 502. Further, the impedance $r_{ocas}+R_L$ is high due to the higher value of $r_{ocas}$. The tracking of changes in the gate and source voltage of cascoded transistor 502 is done by inserting source follower circuit 512. The small signal voltages $\Delta V_Y$ and $\Delta V_Z$ track each other due to buffering action and their corresponding values in terms of small signal parameters of FETs as given below.

Figure 6:
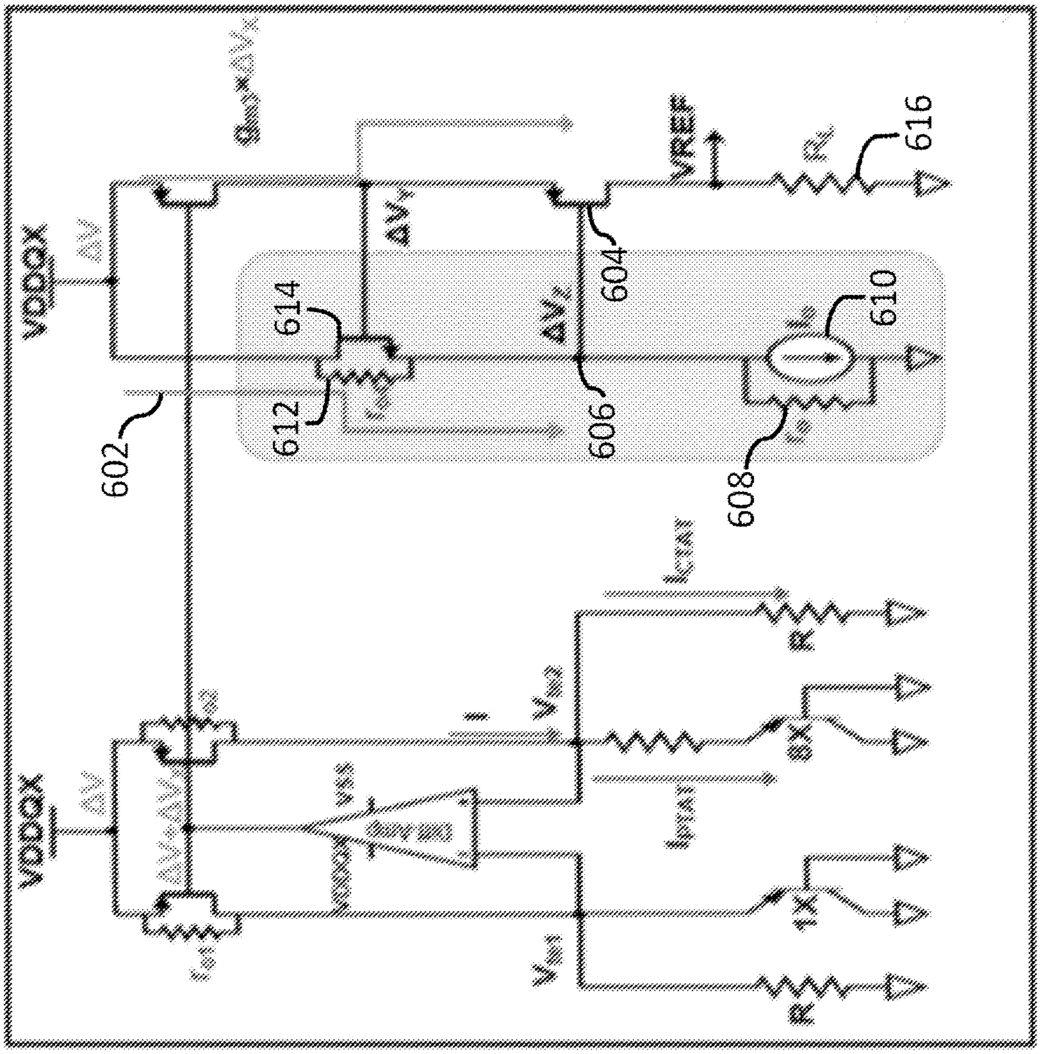
FIG. 6 is a diagram showing an example of a source follower cascoded bandgap reference circuit according to embodiments of the present disclosure.

Referring now to FIG. 6 another example of a source follower cascoded bandgap reference circuit 600 is provided. Some source follower based cascoded BGR architectures 600 have two major limitations in terms of incapability of supply noise reduction in a first noise path 602 as shown in FIG. 6. The other issue being the lack of proper tracking of any change in voltage at the gate and the source of cascoded transistor 604 (e.g., $\Delta V_Z\neq\Delta V_Y$). As shown in FIG. 6, the contribution of supply noise in first noise path 602 at node 606 for cascoded transistor 604 is given by, $\Delta V_Z=\Delta V_X[r_o/(r_o+r_{04})]$, where $r_0$ is the impedance across resistor 608 for current source 610 and $r_{04}$ is the output impedance of resistor 612 for transistor 614. In order to achieve better tracking of the gate and the source voltage of cascoded transistor 604, it is necessary to have a higher transconductance of transistor 614 (e.g., gm4), which, in turn, requires a higher bias ($I_o$) current at current source 610. The higher bias current ($I_o$) of current source 610 may lead to a lower output impedance from resistor 612 for transistor 614. Hence $\Delta V_Z\approx\Delta V$ since ($r_o r_{o4}$). Due to the almost complete transfer of supply noise ΔV at the gate of cascoded transistor 604, the $\Delta V_Z$ produces the extra noise current in cascoded transistor 604, which flows through load resistor 616 and degrades the PSRR. For better tracking of the change in voltage at the gate and the source of cascoded transistor 604, it may be necessary for a higher $g_{m4}$, which indirectly requires a higher DC bias current consumption.

Figure 7:
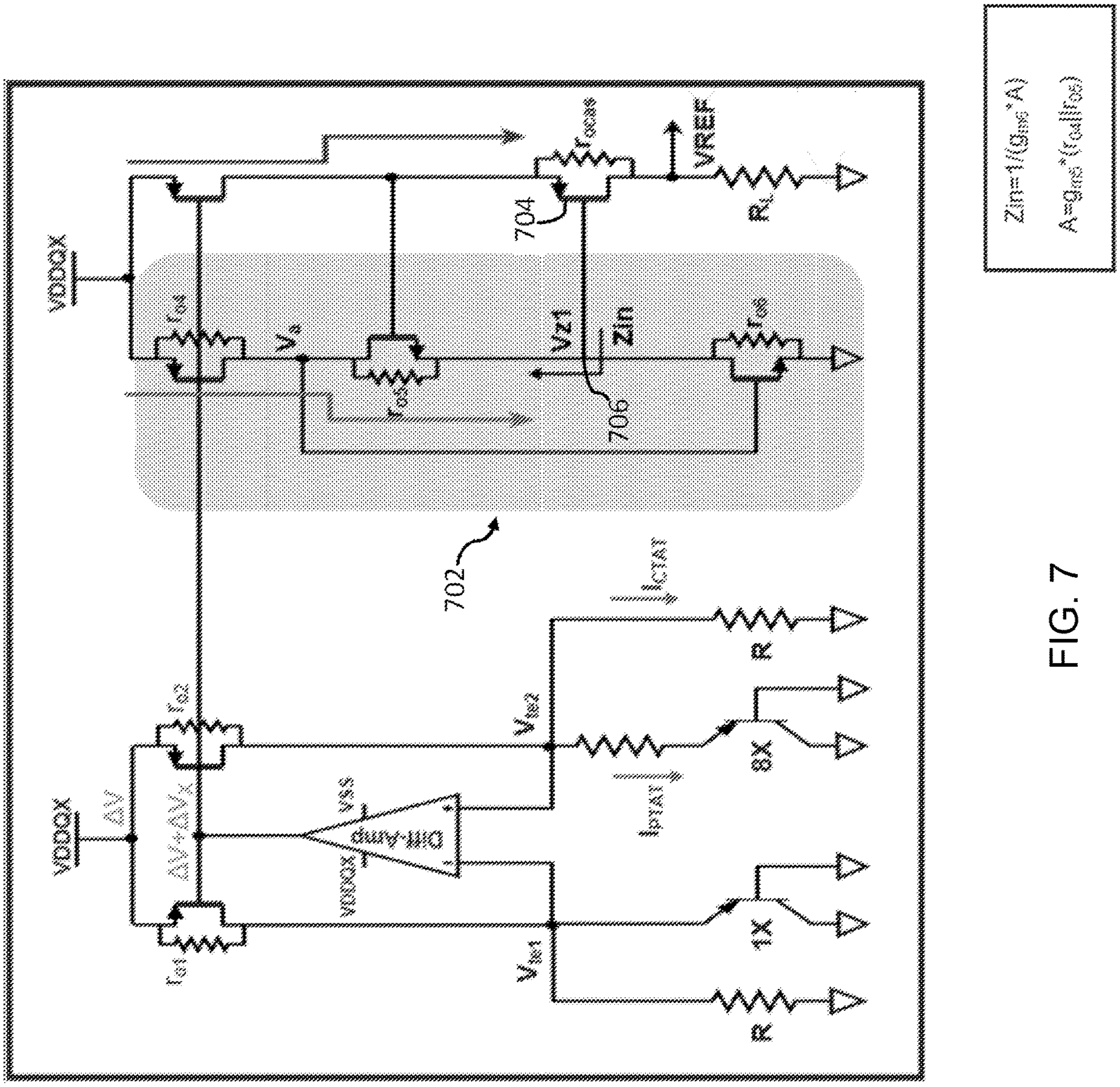
FIG. 7 is a diagram showing an example of a flipped voltage follower cascoded bandgap reference circuit according to embodiments of the present disclosure.

Referring now to FIG. 7, another example of a flipped voltage follower cascoded bandgap reference circuit 700 is provided. Circuit 700 incorporates a flipped voltage follower circuit 702 for improving the power supply rejection ratio (PSRR) with low power consumption. Flipped voltage follower circuit 702 may reduce the looking in impedance at the gate of cascoded transistor 704 as well as the supply noise contribution at the $V_{Z1}$ node 706. Due to its inherent feedback structure, the output impedance at node $V_{Z1}$ 706 may be reduced significantly by an amount of the loop gain and the supply noise is also being attenuated at node $V_{Z1}$ 706.

Figure 8:
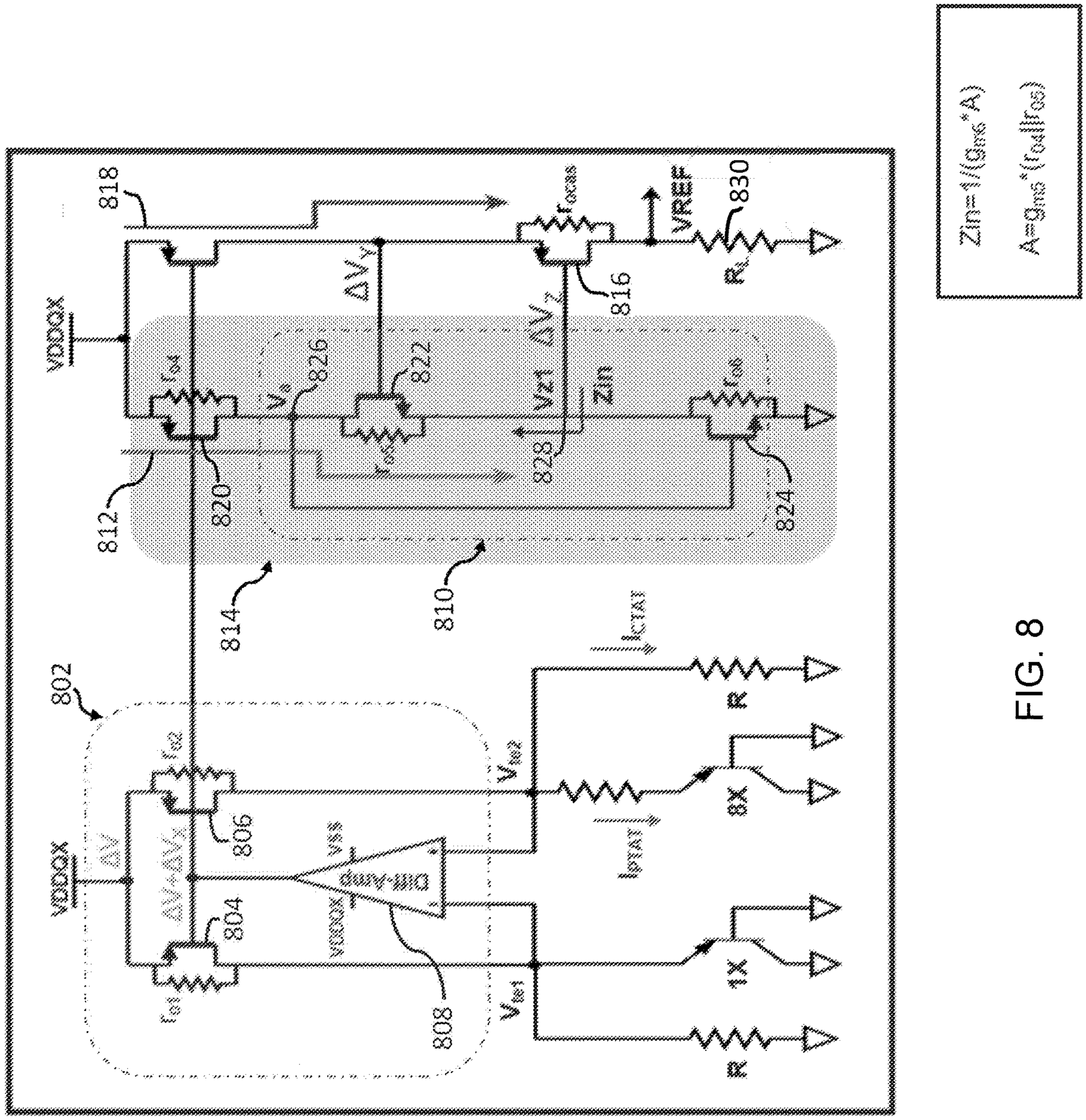
FIG. 8 is a diagram showing an example of a flipped voltage follower cascoded bandgap reference circuit according to embodiments of the present disclosure.

Referring now to FIG. 8 another example of a flipped voltage follower cascoded bandgap reference circuit 800 is provided. Circuit 800 may include core bandgap reference circuit 802 including first transistor 804, second transistor 806, and differential amplifier 808. Circuit 800 may further include a cascoded bandgap reference circuit 810 in electrical communication with core bandgap reference circuit 802. Cascoded bandgap reference circuit 810 may include a first supply noise path 812 that includes a plurality of transistors 820, 822, and 824 that are electrically connected and a flipped voltage follower configuration 814 that reduces an impedance at a transistor 816 associated with a second supply noise path 818. The plurality of transistors includes third transistor 820, fourth transistor 822, and fifth transistor 824. Node 826 of first supply noise path 812 may be directly connected to fifth transistor 824. The second supply noise path 818 may include a plurality of transistors. Transistor 816 may be associated with the second supply noise path 818 and may be connected to node 828 of the first supply noise path 812.

In some embodiments, circuit 800 works on the principle of suppressing the extra noise current ($g_{m3} \times \Delta V_x$) through load resistor 830 which may be achieved using a number of techniques. In the first technique, the change in voltage $\Delta V_Y$ due to the change in supply noise through the second supply noise path 818 is followed at the gate of cascoded transistor 816 as $\Delta V_Z$. The tracking of change in voltage at the gate and source of cascoded transistor 816 is possible due to a significant lowering of looking-in impedance Zin at $V_{z1}$ node 828. The looking-in impedance Zin may be expressed in the equations shown at the bottom of FIG. 8.

Figure 9:
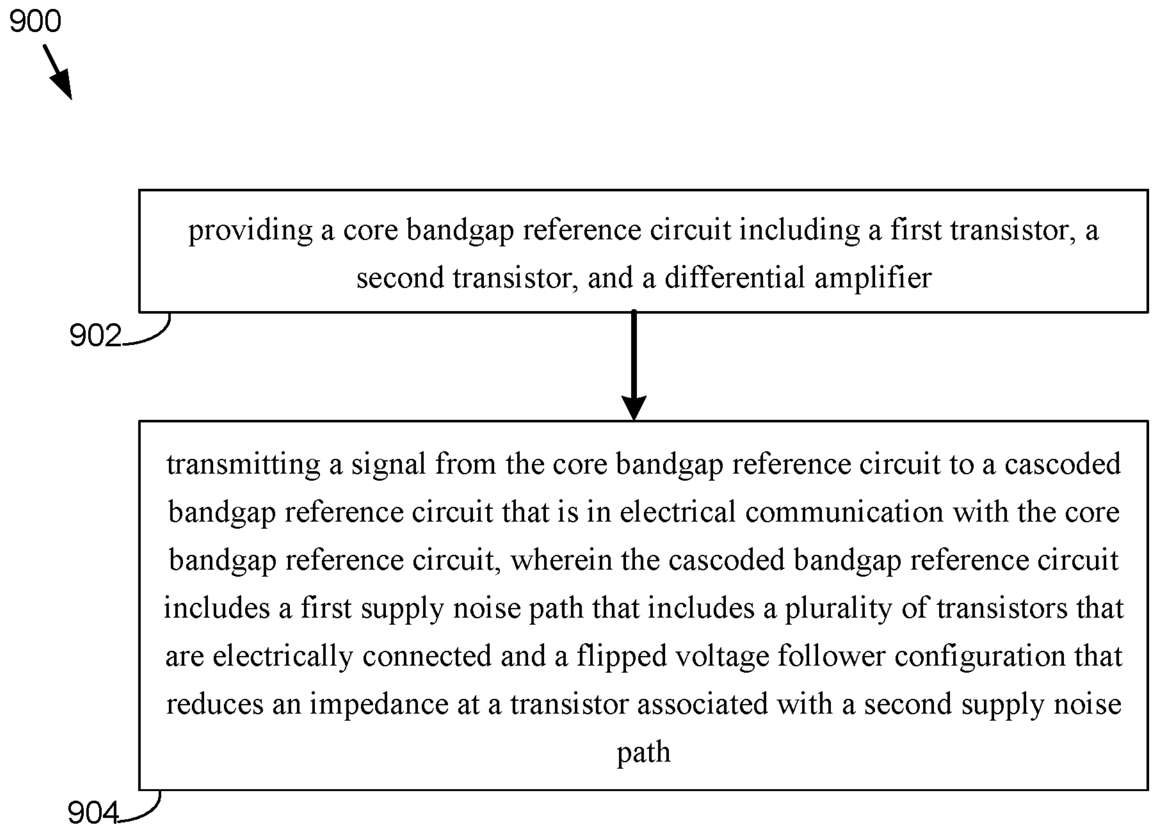
FIG. 9 is an exemplary flowchart of a method according to an embodiment of the present disclosure.

Referring now to FIG. 9, a flowchart depicting an embodiment consistent with the present disclosure is provided. The method may include providing (902) a core bandgap reference circuit including a first transistor, a second transistor, and a differential amplifier. The method may further include transmitting (904) a signal from the core bandgap reference circuit to a cascoded bandgap reference circuit that is in electrical communication with the core bandgap reference circuit, wherein the cascoded bandgap reference circuit includes a first supply noise path that includes a plurality of transistors that are electrically connected and a flipped voltage follower configuration that reduces an impedance at a transistor associated with a second supply noise path. Numerous other operations are also within the scope of the present disclosure.

Figure 10:
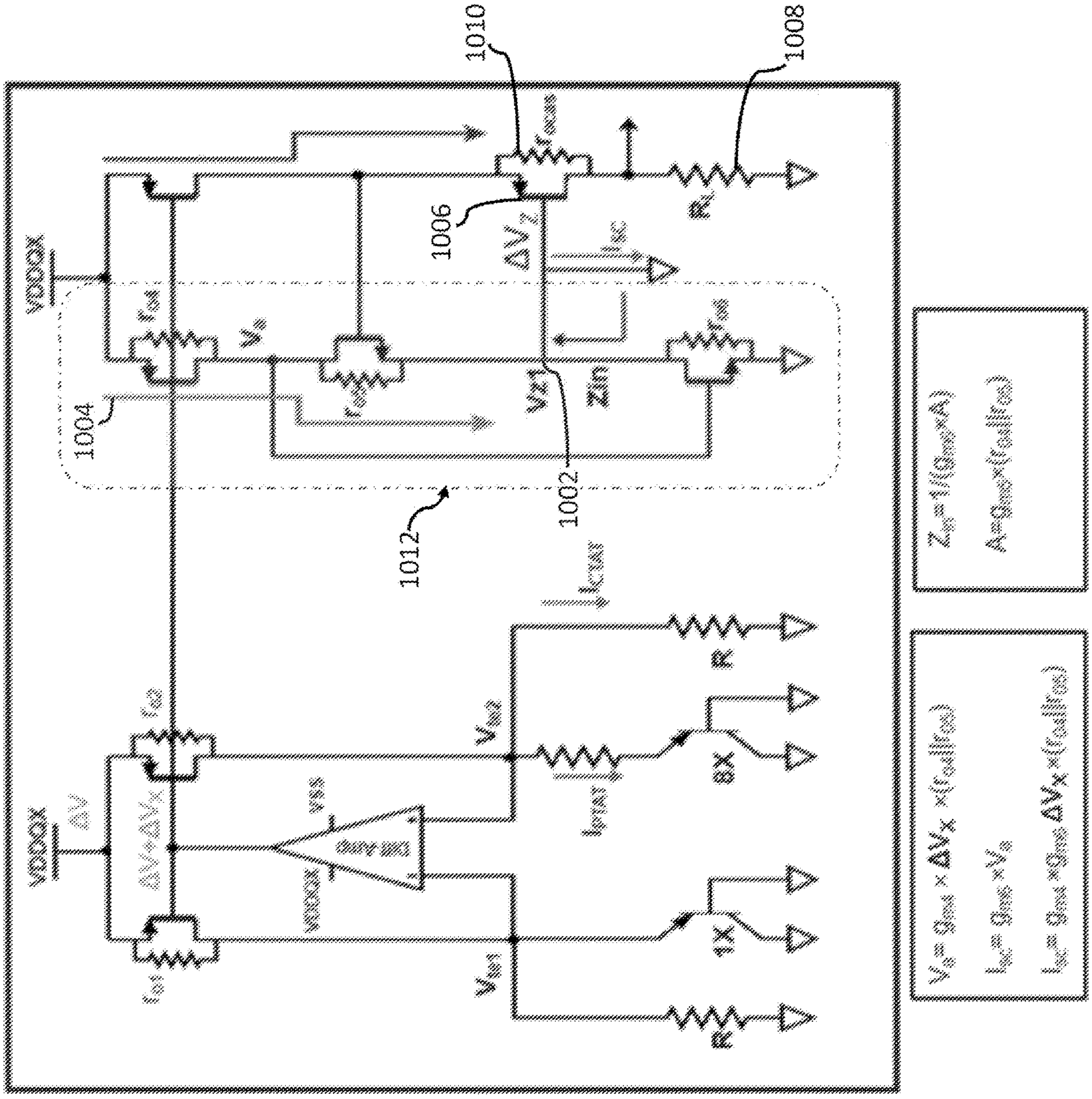
FIG. 10 is a diagram showing an example of a flipped voltage follower cascoded bandgap reference circuit according to embodiments of the present disclosure.

Referring now to FIG. 10 another example of a flipped voltage follower cascoded bandgap reference circuit 1000 is provided. Another technique by which the proposed architecture helps in improving the DC PSRR is due to the significant attenuation of supply noise at $V_{z1}$ node 1002 through first supply noise path 1004 as shown in FIG. 10. The amount of attenuation of supply noise at $V_{z1}$ node 1002 through first supply noise path 1004 can be found out by applying simple Norton's theorem, for example, finding the $I_{sc}$ and $Z_{in}$ impedance at $V_{z1}$ node 1002. The value of $I_{sc}$ can be found in terms of $\Delta V_X$ as shown at the bottom of FIG. 10. Since gm4<<<gm5, ΔVz<<<1, then the supply noise through first supply noise path 1004 at $V_{z1}$ node 1002 drastically attenuated, which in turn does not produce any noise current through the gate of cascoded transistor 1006 to the resistor 1008 having load resistance ($R_L$).

Based on the working principle of the proposed architecture one can easily infer the change in voltage of the gate and source of cascoded transistor 1006 due to supply noise quite adequately tracking each other. As a result, the looking-in impedance through the source of cascoded transistor 1006 is given by $r_{ocas}+R_L$, where $r_{ocas}$ is the output impedance of resistor 1010. Since $r_{ocas}$ is high, the proposed architecture 1000 gives the advantage of higher DC PSRR without degrading the offset voltage in the BGR due to both random/systematic mismatching. Also, one should keep in mind that the supply noise through the first supply noise path 1004 is also less due to this proposed architecture 1000, else it will adversely affect, the overall PSRR of BGR. Because of the higher loop gain of the flip voltage follower circuit 1012, it is possible to have a lower output impedance at the output of the flip voltage follower circuit 1012 with lower DC power consumption, which makes this architecture a preferred choice to use in low supply voltage (<1V) application. Due to low impedance at the flipped voltage follower output node, the feedback loop becomes faster and is hence able to improve the PSRR even at high frequency. Embodiments included herein may be implemented using active devices and hence may consume far less area.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A circuit comprising:

a core bandgap reference circuit including a first transistor, a second transistor, and a differential amplifier; and a cascoded bandgap reference circuit in electrical communication with the core bandgap reference circuit, wherein the cascoded bandgap reference circuit includes a first supply noise path that includes a first plurality of transistors that are electrically connected and a flipped voltage follower configuration that reduces an impedance at a transistor associated with a second supply noise path, wherein the first plurality of transistors includes a third transistor, a fourth transistor, and a fifth transistor, wherein the transistor associated with the second supply noise path is connected to a node of the first supply noise path, and wherein the node is located between the fourth transistor and the fifth transistor.

2. The circuit of claim 1, wherein the second supply noise path includes a second plurality of transistors.

3. The circuit of claim 1, wherein the first transistor and the second transistor of the core bandgap reference circuit are in electrical communication with the first and second supply noise paths.

4. A method comprising:

providing a core bandgap reference circuit including a first transistor, a second transistor, and a differential amplifier; and transmitting a signal from the core bandgap reference circuit to a cascoded bandgap reference circuit that is in electrical communication with the core bandgap reference circuit, wherein the cascoded bandgap reference circuit includes a first supply noise path that includes a first plurality of transistors that are electrically connected and a flipped voltage follower configuration that reduces an impedance at a transistor associated with a second supply noise path, wherein the first plurality of transistors includes a third transistor, a fourth transistor, and a fifth transistor, wherein the transistor associated with the second supply noise path is connected to a node of the first supply noise path, and wherein the node is located between the fourth transistor and the fifth transistor.

5. The method of claim 4, wherein the second supply noise path includes a second plurality of transistors.

6. The method of claim 4, wherein the first transistor and the second transistor of the core bandgap reference method are in electrical communication with the first and second supply noise paths.

7. A system comprising:

a voltage generator including a core bandgap reference circuit including a first transistor, a second transistor, and a differential amplifier, the voltage generator further including a cascoded bandgap reference circuit in electrical communication with the core bandgap reference circuit, wherein the cascoded bandgap reference circuit includes a first supply noise path that includes a first plurality of transistors that are electrically connected and a flipped voltage follower configuration that reduces an impedance at a transistor associated with a second supply noise path, wherein the first plurality of transistors includes a third transistor, a fourth transistor, and a fifth transistor, wherein the transistor associated with the second supply noise path is connected to a node of the first supply noise path, and wherein the node is located between the fourth transistor and the fifth transistor;

an analog to digital converter configured to receive an output from the voltage generator;

a digital to analog converter configured to receive an output from the analog to digital converter; and a second differential amplifier configured to receive an output from the digital to analog converter.

8. The system of claim 7, wherein the second supply noise path includes a second plurality of transistors.

* * * * *